United States Patent [19]
Brink et al.

[11] Patent Number: 6,038,450
[45] Date of Patent: Mar. 14, 2000

[54] SOFT HANDOVER SYSTEM FOR A MULTIPLE SUB-CARRIER COMMUNICATION SYSTEM AND METHOD THEREOF

[75] Inventors: Stephan ten Brink, Württemberg, Germany; Richard D. J. van Nee, De Meern, Netherlands

[73] Assignee: Lucent Technologies, Inc., Murray Hill, N.J.

[21] Appl. No.: 08/928,307

[22] Filed: Sep. 12, 1997

[51] Int. Cl.[7] .................................. H04Q 7/20; H04Q 7/36
[52] U.S. Cl. .................... 455/442; 455/442; 455/436; 455/437; 455/438; 455/439; 370/331; 370/332; 370/334
[58] Field of Search .................................. 455/442, 432, 455/436, 437, 438, 443, 441, 502, 503, 504, 506; 370/331, 332, 334, 204, 320

[56] References Cited

U.S. PATENT DOCUMENTS

| | | | |
|---|---|---|---|
| 5,267,261 | 11/1993 | Blakeney, II et al. | 455/442 |
| 5,483,668 | 1/1996 | Malkamaki et al. | 455/442 |
| 5,548,582 | 8/1996 | Brajal et al. | 455/63 |
| 5,613,213 | 3/1997 | Naddell et al. | 455/414 |
| 5,666,366 | 9/1997 | Malek et al. | 455/442 |
| 5,726,978 | 3/1998 | Frodigh et al. | 455/63 |

Primary Examiner—Wellington Chin
Assistant Examiner—Keith Ferguson

[57] ABSTRACT

A soft handover system is provided for a multiple sub-carrier communication system, applicable to the uplink (mobile unit to base stations) and/or the downlink (base stations to mobile unit). The soft handover system uses multiple sub-carriers to simultaneously transmit multiple sub-carrier signals between at least two base stations and the mobile unit in the uplink and/or downlink. In certain embodiments, the soft handover system provides for synchronized multiple sub-carrier transmission such that the delay differences between the multiple sub-carrier transmissions from the different base stations arriving at the mobile unit are within the guard time of the multiple sub-carrier symbols. Certain embodiments of the soft handover system use the same set of sub-carriers for links between the mobile unit and the base stations of different cells, and other embodiments use different sets of sub-carriers for links between the mobile unit and the base stations of different cells. In the soft handover system using the same set of sub-carriers, the mobile unit receives downlink signals with identical data content from the different base stations. The mobile unit need not distinguish between the signals from the different base stations. The mobile unit just treats the downlink signals from the different base stations as multipath components, thereby increasing the diversity gain. In the case of a multiple sub-carrier CDMA system, the soft handover system can use the same sub-carriers as well as the same CDMA encoding and/or spreading code.

25 Claims, 3 Drawing Sheets

SOFT HANDOVER SYSTEM FOR A MULTIPLE SUB-CARRIER COMMUNICATION SYSTEM AND METHOD THEREOF

BACKGROUND OF THE INVENTION

1. Field of The Invention

This invention relates to wireless communication systems and, more particularly, to multiple sub-carrier communication systems.

2. Description of Related Art

Soft handover is a well known technique in direct sequence code division multiple access (CDMA) systems where it is used to increase the system capacity and reliability. In a hard handover, a mobile unit selects the base station producing the strongest signals among a plurality of base stations. Because of the fading statistics for the transmission path between the mobile unit and the base station, however, signal fading occurs. As such, there is often no single base station producing the strongest signals all of the time. In cases where no base station transmits signals having a dominant power level all the time, soft handover is a technique where a mobile unit is simultaneously communicating with multiple base stations. In doing so, soft handover increases the capacity and reliability of the communication system because soft handover provides diversity. Diversity is a method of using independent fading signals received on several transmission paths all carrying the same message to improve the reliability of the transmission. Proper combination of the signals from these transmission paths yields a resultant signal with reduced fading and improved reliability. Accordingly, instead of switching to a single base station (hard handover), the mobile unit maintains communication links with multiple base stations, so a communication outage can only occur if all the communication links fail simultaneously. When using a soft handover, a mobile unit can typically transmit signals with less power to maintain a given link quality because of the increased reliability that diversity provides. Consequently, the mobile unit creates less interference, thereby increasing the capacity of the network.

Multiple sub-carrier modulation systems typically involve a data signal of successive symbols being split into several lower rate signals (multiple sub-carrier signal), such that the symbol time becomes large compared to the expected multipath delay spread. One such multiple sub-carrier modulation scheme is called orthogonal frequency division multiplexing (OFDM). OFDM is a block-oriented modulation scheme that maps data symbols onto N orthogonal sub-carriers separated by a distance of 1/T, where T is the block period. Multiple sub-carrier transmission systems use OFDM modulation to send data bits in parallel over multiple, adjacent sub-carriers (also called tones or bins). The term "sub-carrier" is used because although the data signal is modulated onto carriers of different frequencies, each "carrier" only carries a fraction of the data signal.

An important advantage of multiple sub-carrier transmission is that inter-symbol interference due to signal dispersion (or delay spread) in the transmission channel can be reduced or even eliminated by inserting a guard time interval between the transmission of subsequent symbols, thus avoiding the need for a complex equalizer at the receiver. The guard time allows delayed copies of each symbol, arriving at the receiver after the intended signal, to die out before the succeeding symbol is received.

There are several different schemes of multiple sub-carrier modulation possible for communications between the mobile units and the base stations. The most simple case is where each mobile unit has a different but fixed and contiguous block of sub-carriers. Other possibilities are to use hopping of the sub-carriers, or to use a random (non-contiguous) set of sub-carriers. Furthermore, it is also possible to use multiple sub-carrier CDMA, where several mobile units can share the same block of sub-carriers for transmitting respective data signals using different sub-carrier encoding and/or spreading codes (CDMA codes). As such, multiple sub-carrier CDMA refers to broadband multiple sub-carrier modulation with encoding and/or spreading of the data symbol on the sub-carriers using CDMA codes, thereby allowing multiple access to the same sets of sub-carriers.

A soft handover system for a multiple sub-carrier system is not known, but a soft handover system is needed to enable enhanced performance for multiple sub-carrier communications systems.

SUMMARY OF THE INVENTION

The present invention involves a soft handover system for a multiple sub-carrier communication system, applicable to the uplink (mobile unit to base stations) and/or the downlink (base stations to mobile unit). The soft handover system uses multiple sub-carriers to simultaneously transmit multiple sub-carrier signals between at least two base stations and the mobile unit in the uplink and/or downlink. In certain embodiments, the soft handover system provides for synchronized multiple sub-carrier transmission such that the delay differences between the multiple sub-carrier transmissions from the different base stations arriving at the mobile unit are within the guard time of the multiple sub-carrier symbols of the multiple sub-carrier signals. Certain embodiments of the soft handover system use the same set of sub-carriers for links between the mobile unit and the base stations of different cells, and other embodiments use different sets of sub-carriers for links between the mobile unit and the base stations of different cells. In the soft handover system using the same set of sub-carriers, the mobile unit receives downlink signals with identical data content from the different base stations. The mobile unit need not distinguish between the signals from the different base stations. The mobile unit just treats the downlink signals from the different base stations as multipath components, thereby increasing the diversity gain. In the case of a multiple sub-carrier CDMA system, the soft handover system can use the same sub-carriers as well as the same CDMA encoding and/or spreading code.

In other embodiments, the soft handover system uses different sets of sub-carriers for the different base stations in linking a mobile unit to the base stations of the different cells. In such an embodiment of the soft handover system, the downlink mobile unit independently demodulates the signals on the different sets of sub-carriers from the base stations of the different cells, resulting in increased signal-to-noise ratio gain. After demodulating the different sets of sub-carriers, the demodulated signals can be combined, for example, by using maximal ratio combining. In certain embodiments, the maximal ratio combining can involve combining the demodulated signals on the different sets of sub-carriers in a weighted manner based on the signal power to noise power levels of corresponding sub-carriers of the different sets of sub-carriers. In a multiple sub-carrier CDMA system according to embodiments using different sets of sub-carriers, the soft handover system can use different CDMA codes with the same or different sets of sub-carriers, or the soft handover system can use the same CDMA code on different sets of sub-carriers.

BRIEF DESCRIPTION OF THE DRAWINGS

Other aspects and advantages of the present invention may become apparent upon reading the following detailed description and upon reference to the drawings in which.

DETAILED DESCRIPTION OF THE DRAWINGS

Illustrative embodiments of the soft handover system for a multiple sub-carrier system according to the principles of the present invention are described below as the soft handover system might be implemented to improve performance of the multiple sub-carrier communication system. In certain embodiments, the soft handover system uses the same set of sub-carriers by the different base stations on the downlink for simultaneously transmitting downlink data signals, including voice, to the mobile unit. In doing so, the mobile unit treats the downlink signals from the different base stations as multipath components, thereby increasing diversity gain. Another advantage of the soft handover system using the same set of sub-carriers and the same CDMA code (in the multiple sub-carrier CDMA implementation) on the downlink is simpler implementation. Since the transmissions are effectively combined "on the air" at the receiver of the mobile unit, no additional hardware is needed at the mobile unit, only some extra protocol features to connect to the base stations simultaneously. In fact, the mobile unit does not need to know that it is in a soft handover state.

Other embodiments of the soft handover system for a multiple sub-carrier system use different sets of sub-carriers for the different base stations in simultaneously linking the mobile unit to the different base stations. In such an embodiment of the soft handover system, the downlink mobile unit independently demodulates the signals from the different base stations, thereby increasing signal-to-noise ratio (SNR) gain. The soft handover system according to these embodiments has the advantage of increased signal-to-noise ratio gain in the downlink because of receiver diversity. Additionally, the base stations have more freedom to allocate available sub-carriers and/or CDMA codes. These embodiments do require extra hardware at the mobile unit because the soft handover system demodulates (an) additional set(s) of sub-carriers and/or extra CDMA code(s). Furthermore, these soft handover systems have to perform extra multiplications and additions for any maximal ratio combining of the signals from the different base stations.

Figure 1:
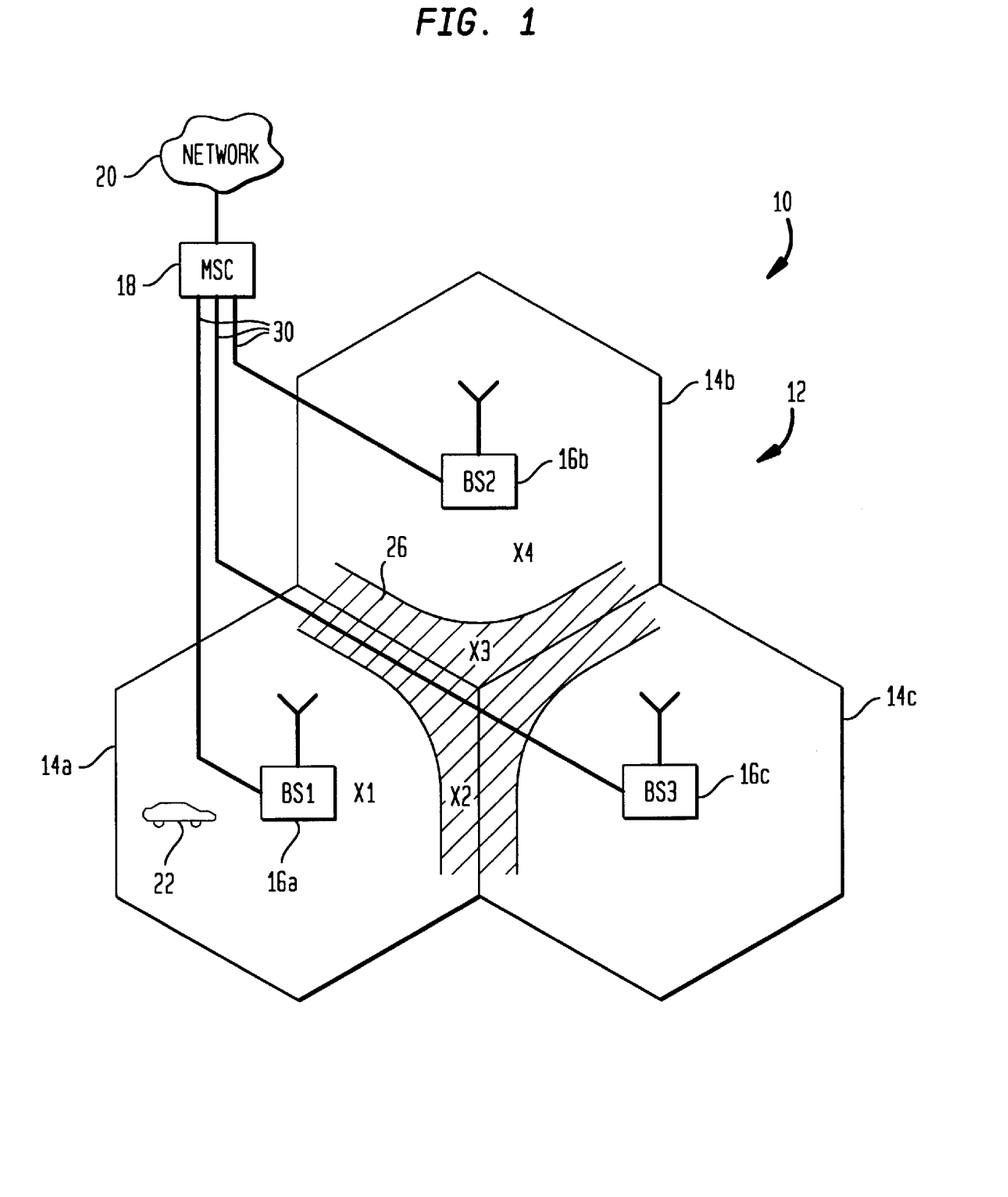
FIG. 1 shows a multiple sub-carrier communication system using a soft handover system according to the principles of the present invention.

FIG. 1 shows a wireless communication system 10 used in accordance with certain embodiments of the present invention. The wireless communication system 10 provides wireless communication services to a geographic area 12. In this particular embodiment, the geographical area 12 is divided into a plurality of cells 14a, 14b and 14c. Depending on the particular wireless communication system 10, geographic area 10 can be divided into additional cells or at least two cells, and each cell 14 can be further divided into a plurality of sectors (not shown). Additionally, the cells 14a–c are shown as hexagonal areas, but different area shapes and numbers of cells are possible. In this particular embodiment, each of the cells 14a–c has an associated base station 16a–c, which provides wireless communication coverage to the respective cells 14a–c. Each of the base stations 16a–c is connected to a mobile switching center (MSC) 18. Alternative wireless communication systems 10 are possible, such as a system in which base stations are connected to other base stations which are then connected to an MSC. Additionally, aspects of the present invention can be utilized in a wireless communications network of non-centralized multiple sub-carrier transceivers.

In this particular embodiment, the MSC 18 maintains wired or wireless links 30 to the base stations 16a–c in the wireless communication system 10 and offers communication links 30 for signaling among the base stations 16a–c. Additionally, the MSC 18 is connected to a network 20, which can be a public switched telephone network (PSTN) 20. Depending on the particular embodiment, the MSC 18 can include a frame handler (not shown), a call processor (not shown) and/or other signal processing and handling circuitry (not shown). Note, each of the base stations 16a–c can also include signal processing and handling circuitry (not shown). Such components typically include processors running software, application specific integrated circuits, and/or discrete components.

In this particular embodiment, each base station 16a–c is a locally fixed terminal which offers communication services to mobile units 22 from its assigned cell 14a–c to other mobile units 22 within its hexagonal cell 14a–c or within a different cell assigned to another base station 16a–c via the MSC 18 and the other base station 16a–c, or to any subscriber of the PSTN 20 connected to the MSC 18. Each base station 16a–c can include a device or circuitry for measuring the received signal power from a mobile unit 22, and each base station 16a–c can report the measured received signal power of the mobile unit 22 to the central MSC 18. A mobile unit 22 requests communication services with another mobile unit 22 in the same or a different cell 14 or to any subscriber of the PSTN 20 connected to the MSC 18. In this particular embodiment, the mobile units 22 include a device or circuitry for measuring signal measurement values, such as received signal power, from the surrounding base stations 16a–c. In certain embodiments, the mobile units 22 measure the signal measurement values by using a common sync/paging channel in the downlink (the base station to the mobile link). The mobile units 22 can report the signal measurement values from the base stations 16a–c to the MSC 18, or the mobile unit 22 can simply request from the MSC 18 a soft handover connection with a base station 16a–c which has acceptable signal measurement values.

According to certain principles of the soft handover system, the base stations 16a–c transmit and/or receive a communication signal to/from a mobile unit 22 on multiple sub-carriers. As such, at least a portion of the communication signals between the base stations 16a–c and the mobile unit 22, take the form of multiple sub-carrier signals comprised of multiple sub-carrier symbols. The mobile unit 22 can distinguish itself from the different mobile units 22 within the same cell 14a–c and amongst neighboring cells 14a–c by using a different but fixed and contiguous block of sub-carriers. Alternatively, the mobile unit 22 can distinguish itself from different mobile units 22 by using different multiple sub-carrier codes. A multiple sub-carrier code can be a tone pattern (fixed subset of available sub-carriers), a frequency hopping pattern (sequence of sub-carriers in time according to the multiple sub-carrier code) or a combination of both for communications between the base stations 16 and the mobile units 22. In a multiple sub-carrier CDMA system, mobile units 22 can use different CDMA codes to distinguish between the different mobile units 22 within the same cell 14a–c and amongst neighboring cells 14a–c. As such, in a multiple sub-carrier CDMA embodiment, different mobiles units 22 can share the same block of sub-carriers by transmitting on those sub-carriers using different CDMA codes.

Figure 2:
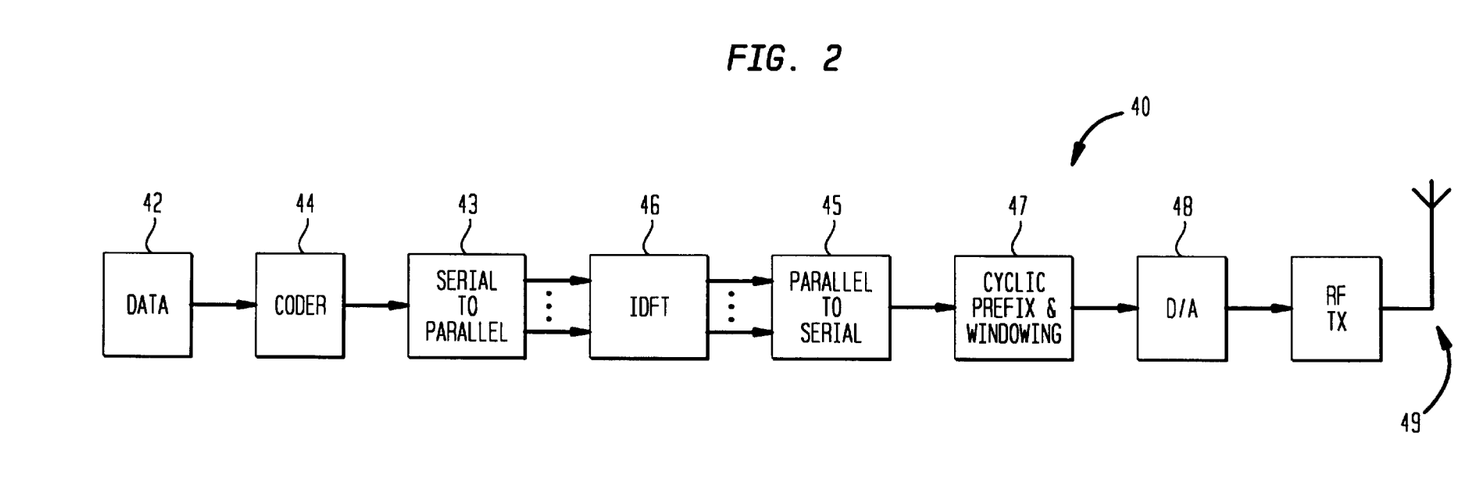
FIG. 2 shows a block diagram of an embodiment of multiple sub-carrier transmitter circuitry which can be used with a soft handover system according to certain principles of the present invention.

In certain embodiments, the wireless communication system 10 can use orthogonal frequency division multiplexing (OFDM). FIG. 2 shows a general block diagram of multiple sub-carrier transmitter circuitry 40, such an OFDM transmitter. Different embodiments of the multiple sub-carrier transmitter circuitry 40 can be used in the base stations 16a–c (FIG. 1) and/or the mobile units 22 which add and/or omit components to transmit communication signals on multiple sub-carriers and for implementing the soft handover system. In this particular example, the multiple sub-carrier transmitter circuitry 40 is located in the base stations 16a–c and uses OFDM. The transmitter circuitry 40 receives a stream of data bits from a data source 42, such as voice information from a PSTN 20 (FIG. 1) which has been sent through the MSC 18 to the base station 16. A coding block 44 receives the data stream and introduces redundancy for forward error correction coding. A serial-to-parallel converter 43 partitions the coded data stream into successive groups or blocks of bits. In this particular embodiment, the blocks of coded data bits are input into an N-points complex Inverse Discrete Fourier Transform 46 (IDFT), where N corresponds to a number of OFDM sub-carriers. In this particular embodiment which uses quadrature phase shift keying (QPSK) modulation, the IDFT 46 (an Inverse Fast Fourier Transform in some embodiments) is performed on blocks of $2N_d$ coded data bits, where $2N_d$ is the total number of bits in a OFDM symbol when using QPSK which modulates two data bits per sub-carrier. Assuming QPSK is used for this particular embodiment, the $2N_d$ bits are converted into $N_d$ complex numbers which are used to modulate $N_d$ sub-carriers. $N_d$ can be equal to N but should be less than N to produce an oversampled signal and to allow for multiple access. As such, in this particular embodiment, the extra $N-N_d$ sub-carriers can be set to zero.

In this particular embodiment, the output of the IDFT 46 is parallel-to-serially converted by parallel-to-serial converter 45 to produce an OFDM symbol or multiple sub-carrier symbol for transmission. To decrease the sensitivity to inter-symbol interference, the cyclic prefixer and windowing block 47 copies the last part of the OFDM symbol and augments the OFDM symbol with the copied portion of the OFDM symbol. This is called cyclic prefixing. To reduce spectral sidelobes, the cyclic prefixing and windowing block 47 performs windowing on the OFDM symbol by applying a gradual roll-off pattern to the amplitude of the OFDM symbol. The OFDM symbol is input into a digital-to-analog converter 48 after which it is sent to the transmitter front-end 49 that converts the baseband wave form to the appropriate RF form for transmission.

Figure 3:
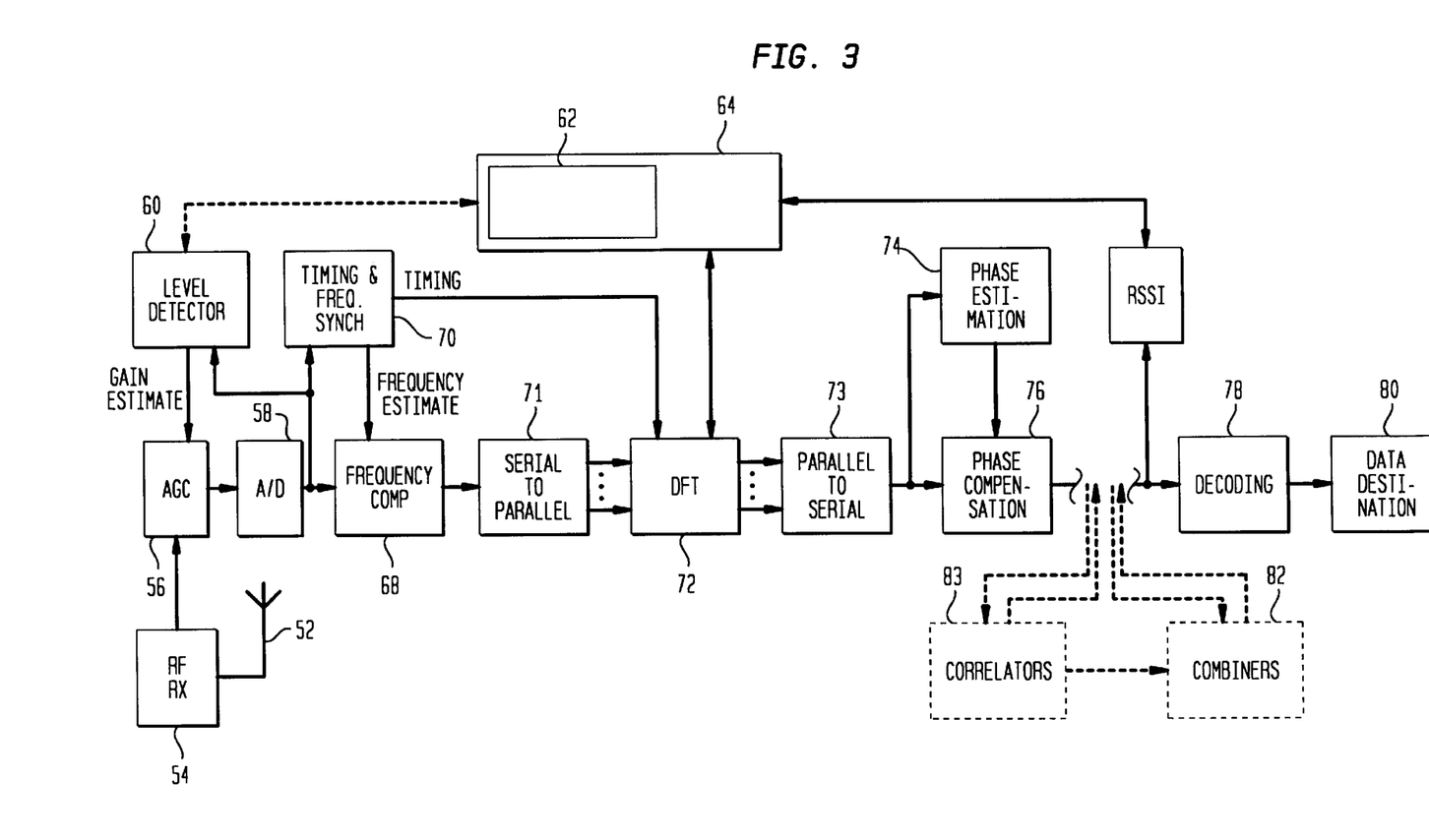
FIG. 3 shows a block diagram of an embodiment of multiple sub-carrier receiver circuitry which can be used with a soft handover system according to certain principles of the present invention.

FIG. 3 shows a functional block diagram of multiple sub-carrier receiver circuitry 50 which receives transmitted signals from an embodiment of a multiple sub-carrier transmitter circuitry 40 (FIG. 2). In this particular embodiment, the multiple sub-carrier receiver circuitry 50 is an OFDM receiver 50. Different embodiments of the OFDM receiver circuitry 50 can be used at a base station 16 or mobile unit 22 which add or omit components to transmit communication signals on multiple sub-carriers and for implementing the soft handover system. For the soft handover system on the downlink (also referred to as the forward link from the base station 16 to the mobile unit 22), the receiver circuitry 50 of the mobile unit 22 (FIG. 1) combines the downlink signals from several base stations 16a–c (FIG. 1) either non-coherently "on the air" prior to the receiver's antenna 52 when at least two base station 16 use the same set of sub-carriers or coherently with additional receiver hardware (for example, additional phase estimation/compensation circuitry for each base station that is using a different set of sub-carriers and a combiner (adders)).

In accordance with certain embodiments of the soft handover system in the uplink (also referred to as the reverse link from the mobile unit 22 to the base stations 16a–c), the base stations 16a–c "collect" the received signals from the mobile unit 22 and send the received signals to the MSC 18 where the received signals are combined. In this particular embodiment on the uplink, the mobile unit 22 can transmit on the same or a different set of sub-carriers than was used on the downlink. Alternatively, on the uplink, the mobile unit 22 can transmit on a single carrier and/or use alternative modulation schemes.

In this particular embodiment, the OFDM signals from the base stations 16a–c are received at the antenna 52 and processed (down converted) using the receive circuitry 54 and automatic gain control (AGC) block 56. The processed OFDM signal is input into an analog-to-digital converter 58 and converted to digital form. The digital OFDM signal is received by a level detector 60 to provide a gain estimate feedback signal to the AGC 36. In certain embodiments, the level detector 60 can be used to perform signal measurements on the incoming signals for use by a portion 62 of the soft handover system in the control circuitry 64 of the receiver circuitry 50. Alternatively, it should be understood that different signal quality measurements can be performed at various points of the receiver 50. For example, a received signal strength indicator (RSSI) 65 can be used in the receiver 50 to measure the signal quality, and the output of the RSSI 65 can be provided to the portion 62 of the soft handover system in the control circuitry 64.

The RSSI 65 is shown as coupled to the output of a phase compensation block 76, but the RSSI 65 can be coupled to alternative and/or multiple locations to measure various signal measurement values, such as average power level, of the signals received from the multiple sub-carrier transmitter circuitry 40 (FIG. 2) of a base station 16 according to the soft handover system discussed below. The received signals can be measured by various signal measurements, such as the received signal strength, received signal to noise plus interference ratio, detected errors (CRC), the presence of acknowledgments (lack of acknowledgments is bad) and average power level. Alternatively, the receiver circuitry 50 of the receiving mobile unit 22 (FIG. 1) on the downlink or the receiving base station 16 (FIG. 1) on the uplink can perform signal measurements on the received signal(s) and send back the signal information through its transmitter circuitry 40 (FIG. 1) to the receiver circuitry 50 of the transmitting mobile unit 22 or the transmitting base station 16.

The portion 62 of the soft handover system is shown as part of the control circuitry 64 of the multiple sub-carrier receiver circuitry 50. Only some connections between the control circuitry 64 and the other blocks of the receiver circuitry 50 are shown, but it should be understood that the control circuitry 64 can be connected to all of the blocks in some fashion or that portions of the control scheme are located within each of the blocks. Additionally, other portions of the soft handover system can be located in the blocks of the receiver circuitry 50, such as in the level detector 60, in the blocks of the multiple sub-carrier transmitter circuitry 40 (FIG. 2), in the base stations 16 and/or in the MSC 28.

The digital OFDM signal from the analog to digital converter 58 is also received by a frequency compensation block 68 and a timing and frequency synchronization block 70. The timing and frequency synchronization block 70 acquires the OFDM symbol timing and provides a frequency estimate signal to the frequency compensation block 68 to correct for initial frequency offset and a timing signal to a Discrete Fourier Transform (DFT) block 72. The OFDM signal is serial-to-parallel converted by a serial-to-parallel converter 71 and provided to the DFT 72. The DFT 72 (Fast Fourier Transform in some embodiments) is designed to perform an N-point discrete fourier transform on the sub-carriers making up the multiple sub-carrier signals or OFDM signals from the transmitter circuitry 40 (FIG. 2) of the transmitting base stations 16 or the transmitting mobile 22. In the case of $N_d$ sub-carriers for this particular embodiment, the resulting $N_d$ complex sub-carriers are parallel-to-serial converted by a parallel-to serial converter 73 and input into a phase estimation block 74 and the phase compensation block 76. As mentioned for the transmitter circuitry 40 (FIG. 2) in this particular embodiment, the extra $N-N_d$ sub-carriers output from the DFT 72 can be treated as zero. The phase estimation block 74 tracks the phases of the $N_d$ sub-carriers and provides phase estimates to the phase compensation block 76 which compensates the $N_d$ sub-carriers accordingly.

For the soft handover system using the same set of sub-carriers by the different base stations 16a–c on the downlink, the receiver 50 for the mobile 22 (FIG. 1) includes one set of the phase estimation block 74 and the phase compensation block 76. In the embodiment using the same set of sub-carriers for the different base stations 16a–c, the compensated sub-carriers are input into a decoding block 78 which decodes the forward error correcting code of the multiple sub-carrier transmitter 40 (FIG. 2) and provides the data signals to the data destination 80. For the soft handover system using different sets of sub-carriers by the different base stations 16, the receiver 50 for the mobile 22 (FIG. 1) includes additional sets or hardware for the phase estimation block 74 and the phase compensation block 76 to handle the different sets of sub-carriers used for soft handover from the different base stations 16 (FIG. 1). Additionally, for the soft handover system using different sets of sub-carriers by the different base stations 16, a combiner 82, such as an adder arrangement, is used in certain embodiments to combine respective sub-carriers of the different sets of sub-carriers which correspond to the same portion of the multiple sub-carrier symbol being transmitted.

In the multiple sub-carrier CDMA example, a correlation block 83 receives the compensated sub-carriers from the phase compensation block 76. The correlation block 83 correlates and de-spreads the compensated sub-carriers, which have been combined with the CDMA code(s) at certain embodiments of the transmitter 40 (FIG. 2), to extract the multiple sub-carrier symbol meant for the receiving mobile unit 22 (FIG. 1). The correlation block 83 can be configured to correlate and de-spread the multiple sub-carrier signal from the same set of sub-carriers used by the different base stations 16a–c where the different base stations 16a–c use the same CDMA code assigned to the receiving mobile unit 22 (FIG. 1) and/or where the different base stations 16a–c use different CDMA codes assigned to the receiving mobile unit 22 (FIG. 1). Alternatively, the correlation block 83 can be configured to correlate and de-spread the multiple sub-carrier signal from different sets of sub-carriers used by the different base stations 16a–c where the different base stations 16a–c use the same CDMA code assigned to the receiving mobile unit 22 (FIG. 1) and/or where the different base stations 16a–c use different CDMA codes assigned to the receiving mobile unit 22 (FIG. 1).

In certain embodiments, the correlators 83 directly provide the multiple sub-carrier signal to the decoding block 78. In some embodiments using multiple sub-carrier CDMA, the correlators 82 provide multipath versions of each sub-carrier to the combiner 82 prior to decoding. Where the base stations 16a–c use multiple sub-carrier CDMA on different sets of sub-carriers, the combiner 82 also combines the respective sub-carriers of the different sets of sub-carriers which correspond to the same portion of the multiple sub-carrier signal. Additionally, in certain embodiments using different CDMA codes by the different base stations 16a–c, the combiner 82 is configured to combine the respective sub-carriers which correspond to the same portion of the multiple sub-carrier symbol and which were correlated and de-spread using different CDMA codes. After the appropriate combining of different versions of the multiple sub-carrier symbol for the mobile unit 22, the multiple sub-carrier symbol is output to the decoding block 78. After the appropriate decoding, the multiple sub-carrier symbol is output to the destination or user 80.

In general, the synchronization requirements for a multiple sub-carrier system are more relaxed than for example a pure CDMA system because the symbol rate of a multiple sub-carrier system, such as an OFDM system, is much lower than the chip rate of a pure CDMA system. In the multiple sub-carrier system, the symbol rate is directly related to the guard time (rule of thumb: 1/10 of the symbol duration is guard time). In the soft handover state on the uplink, the base stations 16a–c should receive the signals of all the sub-carriers transmitted by the mobile unit 22 within the guard time tolerance for the multiple sub-carrier symbol. Taking multipath delayed signals into account, more stringent synchronization requirements, e.g., within half the guard time, can be implemented. In the soft handover state on the downlink, the mobile unit 22 should also receive the signals of all the sub-carriers from the different base stations 16a–c within the guard time of the multiple sub-carrier symbol. In certain embodiments of the soft handover system on the downlink when different base stations 16a–c transmit simultaneously at different sub-carriers, symbol synchronization is necessary between the mobiles 22 (FIG. 1) and the base stations 16. Such synchronization is already present in time division multiple access (TDMA) systems like Group Speciale Mobile (GSM).

The Global Positioning System (GPS) can be used to synchronize the different base stations 16a–c similar to manner in which the base stations in an IS-95 CDMA system are synchronized. Alternatively, the base stations 16a–c can be synchronized through wired or wireless links that connect the base stations 16a–c (through the MSC 18 in certain embodiments), and the base stations can synchronize themselves automatically, e.g. according to the respective roundtrip delay. For example, the Japanese Personal Handyphone System (PHS) is believed to perform synchronization of the base stations over the air. Additionally, the MSC 18 (FIG. 1) can be used to synchronize the base stations 16a–c. The mobile unit 22 can be synchronized by monitoring the downlink paging/synch channels and acquiring the timing. For example, as in Group Speciale Mobile (GSM), when the mobile unit 22 requests a call setup, the base station 16 determines the mobile unit's delay compared to the slot timing of the base station 16. The base station 16 then requests that the mobile unit 22 advance its following transmissions. By knowing the mobile's delay from the base station 16, the base station 16 can even compensate for the round trip delay by taking a "timing advance" into account.

The soft handover system is aimed at improving signal reliability especially in areas where signal reliability is needed. FIG. 1 shows shaded areas 26 which represent the areas of interest for certain embodiments of the soft handover system. The shaded areas 26 are located at the boundary regions of the cells 14a–c. As such, a mobile unit 22 in the region 26 tends to receive relatively weak signals from the base stations 16a–c, and the soft handover system attempts to improve signal reliability especially in the areas 26. Additionally, the shaded areas 26 tend to have a sufficiently small timing offset between the communication signals from at least two of the base stations 16a–c to the mobile unit 22 in the region 26. Alternatively, the soft handover system can be active throughout the cells 14a–c even in areas where the timing offset is relatively large. In those areas, the base stations 16a–c, the mobile unit 22 and/or the MSC 18 must have some form of synchronization so that the signals from the different base stations 16a–c are received by the mobile unit 22 at relatively the same time. Moreover, the signals from the mobile unit 22 must be received by the different base stations 16a–c within a certain time tolerance for collection and processing at the MSC 18 in certain embodiments.

In operation, a particular embodiment of the soft handover system according to the principles of the present invention operates as follows. At position X1 in FIG. 1, the mobile unit 22 is not in a soft handover state. The mobile unit 22 is within the hexagonal cell area 14a of the base station 16a, and the quality of the communications between the base station 16a and the mobile unit 22 is at an acceptable level. The mobile unit 22 communicates through the base station 16a, and to communicate with the base station 16a, the mobile unit 22 uses a set of available sub-carriers. For example, mobile unit 22 can use a set of 24 sub-carriers out of 1000 available sub-carriers to communicate with the base station 16a.

The mobile unit 22 monitors the power levels of the signals from the base station 16a and the power levels of the signals from the other base stations 16b–c. The mobile unit 22 can monitor a variety of channels and perform a variety of signal quality measurements. For example, the mobile 22 can monitor any designated signaling channel for each of the base stations 16a–c (for example a pilot/synch/paging channel), any data channels or a subset of the data channels of the respective base stations 16a–c, and/or look for periodically inserted pilot symbols. The mobile can measure the average power level of the signals on the monitored channel (s) by using, for example, the RSSI 65 (FIG. 3). A variety of power and other quality measurements can be performed.

When the mobile is transitioning from position X1 to position X2, the mobile unit 22 in this particular example notices that the communication signals from the base station 16a are getting weaker and have fallen below a certain level. The mobile unit 22 also detects the presence of communication signals from the base station 16c. Because the measurement values for the signals from the base station 16a are below a certain level and/or the measurement values for the signals from the base station 16c are above a certain level, the mobile unit 22 requests a soft handover connection with the base station 16c. In this particular embodiment, the mobile unit 22 makes a request for a soft handover to the base station 16c, which negotiates any further action with the MSC 18. The mobile unit 22 initiates the soft handover based on power level or signal quality measurement values of communication signals from the base stations 16c. Alternatively, a base station 16c can initiate a soft handover connection between the base station 16c and the mobile unit 22 based on measurement values of communication signals from the mobile unit 22 to the base station 16c, or the base station 16c can provide measurement values for the signals from the mobile 22 to the MSC 18 which initiates the soft handover. Additionally, the mobile unit 22 can transmit the measurement values for signals it receives from the base stations 16c to the base station 16a or c, and the base station 16a or c initiates the soft handover, or those measurement values are sent to the MSC 18 which initiates the soft handover.

To initiate a soft handover, the mobile unit 22 and the base station 16c exchange signaling information through the MSC 18 about when to go into the soft handover state, the base stations 16 involved in the soft handover and the sub-carriers and/or the multiple sub-carrier codes and/or the CDMA codes (in a multiple sub-carrier CDMA implementation) involved in the soft handover connection. In certain embodiments, the mobile unit 22 requests the same set of sub-carriers used by the mobile unit 22 in communicating with the base station 16a for the soft handover connection with the base station 16c. Accordingly, the base station 16c transmits the same data on the same set of sub-carriers as the base station 16a to the mobile unit 22. In the downlink, the mobile unit 22 receives the sum of the sub-carriers with the same data and cannot distinguish between the signals from the base stations 16a and 16c. Although some sub-carriers may become weaker due to the base stations 16a and 16c transmitting the same data on the same sub-carriers, the effect of this embodiment of the soft handover system is analogous to adding extra multipath components, thereby increasing the multipath diversity gain. Furthermore, such embodiments of the soft handover system are relatively easy to implement and do not require additional hardware, just additional protocol features to enable connection to the different base stations simultaneously.

Additionally, in a multiple sub-carrier CDMA system, the soft handover system can use the same sub-carriers and the same CDMA code used by the mobile unit 22 to communicate with the base station 16a in setting up the soft handover connection with the base station 16c.

In other embodiments using this particular example, the soft handover system uses a different set of sub-carriers for the soft handover connection between the mobile unit 22 and the base station 16c. The mobile unit 22 distinguishes between the different base stations 16a and 16c and demodulates the signals from the base stations 16a and 16c separately. As such, using the particular example mentioned above, the mobile unit 22 demodulates 48 different sub-carriers instead of 24, thereby requiring additional hardware and/or demodulating power. The soft handover system using different sets of sub-carriers for soft handover connection provides increased signal-to-noise ratio because of receiver diversity. Additionally, this embodiment provides more freedom to the base station 16c and/or the MSC 18 in allocating available sub-carriers. In a multiple sub-carrier CDMA system, the soft handover system can use different CDMA codes on the same or different sets of sub-carriers or the same CDMA codes on different sets of sub-carriers.

At the position X2, the mobile unit 22 is in the soft handover state and still communicating with both the base station 16a and with the base station 16c according to an embodiment of the soft handover system described above. Alternatively, according to an aspect of the present invention, the soft handover system can include a dual-mode embodiment which advantageously chooses one of the above-described embodiments to use with a particular base station 16a–c depending upon the current traffic, channel availability and other operating states of the base stations 16a–c. As such, the soft handover system can both provide connections between the mobile unit 22 and the base stations 16a–b using the same set of sub-carriers and/or CDMA codes and a connection between the mobile unit 22 and the base station 16c using a different set of sub-carriers if, for example, the base station 16c is already using the set of sub-carriers being used by the base stations 16a–b. Additionally, the soft handover system can use an alternative embodiment wherein of the available sub-carriers that the mobile unit 22 can use, the soft handover system allocates some sub-carriers which are the same for the different base stations 16a–c involved in the soft handover and some sub-carriers which are different for the different base stations 16a–c.

In transition from the position X2 to X3 in this particular example, the soft handover system maintains the soft handover connection between the mobile unit 22 and the base stations 16a and 16c using the same or different sets of sub-carriers according to the embodiments discussed above for the soft handover system. In the multiple sub-carrier CDMA example, the soft handover system can also use the same or different sub-carrier spreading CDMA codes to maintain the soft handover connection. In this particular example, the mobile unit 22 also detects signals from the base station 16b at this point. The mobile unit 22 can detect the base station 16b by monitoring a particular sub-carrier, a particular set of sub-carriers and/or a particular signaling/paging/synch channel. Alternatively, the mobile unit 22 can detect the presence of the base station 16b through communications from the base station 16b via the MSC 18 and one of the base stations 16a or c. In this alternative embodiment, the base station 16b can monitor a particular sub-carrier or set of sub-carriers for the presence of the mobile unit 22.

The mobile unit 22 and/or base station 16b initiates a soft handover based on signal measurement values of the mobile unit 22 and/or the base station 16b. As mentioned above, the signal measurement values can be power value measurements or other signal quality measurements. In certain embodiments, if the signal measurement values of the signals on the particular sub-carrier(s) are above a certain level, a soft handover is initiated. In establishing a soft handover connection between the mobile unit 22 and the base station 16b, the mobile unit 22 and the base station 16b exchange signaling information through the MSC 18 and the base station 16a or the base station 16c. The signaling information includes information on which base station 16 to establish the soft handover connection (e.g., the base station 16b), which sub-carriers to use for the soft handover connection (and/or which CDMA codes to use in a multiple sub-carrier CDMA implementation) and when to establish the soft handover connection.

At position X3, the soft handover system has established and maintains communications between the mobile unit 22 and the base stations 16a–c. As such, if the soft handover connection with the base station 16b is established on a set of sub-carriers (and the same CDMA code(s) in the multiple sub-carrier CDMA example) used for communicating with another base station 16a and/or 16c, the mobile unit 22 can treat the additional signals as multipath components. If the soft handover connection with the base station 16c is established on a different set of sub-carriers (and/or a different CDMA code(s) in the multiple sub-carrier CDMA example) used for communicating with another base station 16a and/or 16c, the mobile unit 22 independently demodulates the signals using different sets of sub-carriers.

In transition from position X3 to position X4, the soft handover system leaves the soft handover state in this particular example because the measurement values for the signals between the mobile unit 22 and base stations 16a and 16c have dropped below a certain level and/or the measurement values for the signals between the mobile unit 22 and the base station 16b are above a certain level. The signal measurements can be made by the mobile unit 22 and/or the base stations 16a–c. In this particular embodiment, the base stations 16a–c exchange signaling information through the MSC 18 about when to leave the soft handover state and that the base station 16b is taking over communications with the mobile unit 22. At position X4, the mobile unit 22 is no longer in the soft handover state, and communications with the mobile unit 22 are performed through the base station 16b.

In addition to the embodiments described above, alternative configurations of the soft handover system for multiple sub-carrier systems are possible which omit and/or add components and/or use variations or portions of the described soft handover system. For example, the soft handover system can use various types of signal measurements in determining whether to enter a soft handover state. Additionally, the multiple sub-carrier communication system using the soft handover system has been described as an OFDM system, but other multiple sub-carrier systems can use the soft handover system according to the principles of the present invention. Furthermore, the above-described soft handover system has been described as being comprised of several components or blocks, but it should be understood that the soft handover system and portions thereof can be implemented in application specific integrated circuits, software-driven processing circuitry, or other arrangements of discrete components.

What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

We claim:

1. A method for providing data signals, said method comprising the steps of:

transmitting from a first base station portions of a data signal in parallel on multiple sub-carriers as multiple sub-carrier symbols; and transmitting from at least a second base station portions of said data signal in parallel on multiple sub-carriers as multiple sub-carrier symbols so that a mobile unit receives said data signal from at least two base stations to achieve soft handover.

2. The method of claim 1 further comprising the step of:

synchronizing said multiple sub-carriers from at least two base stations such that the delay differences of different versions of said portions of said data signal on said multiple sub-carriers are within the guard time of said multiple sub-carrier symbols.

3. The method of claim 1 further including the step of:

using a CDMA code to send said portions of said data signal in parallel on said multiple sub-carriers from said at least two base stations to said mobile unit.

4. The method of claim 1 wherein each of said at least two base stations utilize an orthogonal frequency division multiplexing (OFDM) scheme to transmit portions of said data signal in parallel on multiple sub-carriers.

5. The method of claim 1 wherein each of said at least two base stations transmit portions of said data signal on multiple sub-carriers so that each of said multiple sub-carriers only a fraction of said data signal.

6. The method of claim 1 wherein said at least two base stations use a same set of sub-carriers for transmitting said portions of said data signal to said mobile unit.

7. The method of claim 6 further comprising the steps of:

receiving by said mobile said portions of said data signal on said same set of said sub-carriers; and treating said portions of said data signal on said same set of sub-carriers from said at least two base stations as multipath components.

8. The method of claim 1 wherein said at least two base stations use different sets of sub-carriers to transmit said portions of said data signal to said mobile unit.

9. The method of claim 8 further including the step of:

using different CDMA codes for said at least two base stations to transmit said portions of said data signal on said different sets of sub-carriers from said at least two base stations to said mobile unit.

10. The method of claim 8 further including the step of:

using the same CDMA code on said different sets of sub-carriers.

11. The method of claim 8 further including the steps of:

demodulating independently said multiple sub-carrier symbols on said different set of sub-carriers for each base station.

12. The method of claim 11 further including the step of:

combining the demodulated multiple sub-carrier symbols.

13. The method of claim 12 wherein said step of combining includes the steps of:

using maximal ration combining.

14. A multiple sub-carrier communication system including a soft handover system comprising:

a first base station configured to transmit a data signal using multiple sub-carriers to a mobile unit configured to receive said data signal using multiple sub-carriers from said first base station; and at least a second base station configured to transmit said data signal using multiple sub-carriers to said mobile unit so that said mobile unit receives said data signal from at least two base stations to achieve soft handover.

15. The soft handover system of claim 14 wherein said at least two base stations are configured to use a CDMA code to transmit portions of said data signal in parallel on said multiple sub-carriers from said at least two base stations to said mobile unit.

16. The system of claim 14 wherein each of said at least two base stations utilize an orthogonal frequency division multiplexing (OFDM) scheme to transmit portions of said data signal in parallel on multiple sub-carriers.

17. The system of claim 14 wherein each of said at least two base stations transmit portions of said data signal on multiple sub-carriers so that each of said multiple sub-carriers carry only a fraction of an original data signal.

18. The soft handover system of claim 14 wherein said at least two base stations are configured to transmit said data signal using the same set of multiple sub-carriers.

19. The soft handover system of claim 18 wherein said mobile unit is configured to receive said data signal using the same set of said multiple sub-carriers from said at least two base stations to treat said communication signals on said multiple sub-carriers as multipath components.

20. The soft handover system of claim 14 wherein said at least two base stations are configured to transmit said data signal using different sets of multiple sub-carriers.

21. The soft handover system of claim 20 wherein said mobile is configured to receive said data signal using said different sets of said multiple sub-carriers from said at least two base stations and to independently demodulate said different sets of multiple sub-carriers.

22. A method for providing data signals, said method comprising the steps of:

using multiple sub-carriers to send portions of a data signal in parallel as multiple sub-carrier symbols between a first base station and a mobile unit; and using multiple sub-carriers to send portions of said data signal in parallel as multiple sub-carrier symbols between at least a second base station and said mobile unit so that said data signal is sent between at least two base stations and said mobile unit to achieve soft handover.

23. The method of claim 22 wherein each of said at least two base stations utilize an orthogonal frequency division multiplexing (OFDM) scheme to send said portions of said data signal in parallel on multiple sub-carriers.

24. The method of claim 22 wherein each of said at least two base stations send portions of said data signal on multiple sub-carriers so that each of said multiple sub-carriers carry only a fraction of said data signal.

25. A method for providing data signals, said method comprising the steps of:

receiving at a mobile unit a data signal from a first base station, portions of said data signal having been sent by said first base station in parallel as multiple sub-carrier symbols using multiple sub-carriers; and receiving at said mobile unit said data signal from at least a second base station to achieve soft handover, portions of said data signal having been sent by said at least a second base station in parallel as multiple sub-carrier symbols using multiple sub-carriers.

* * * * *